March 5, 1940.   W. H. HEWITT   2,192,575
MATERIAL DISTRIBUTION SYSTEM
Filed Dec. 16, 1936   2 Sheets-Sheet 1

Inventor.
William H. Hewitt
By
Williams, Bradbury, McCaleb & Hinkle
Attys.

March 5, 1940.  W. H. HEWITT  2,192,575
MATERIAL DISTRIBUTION SYSTEM
Filed Dec. 16, 1936  2 Sheets-Sheet 2
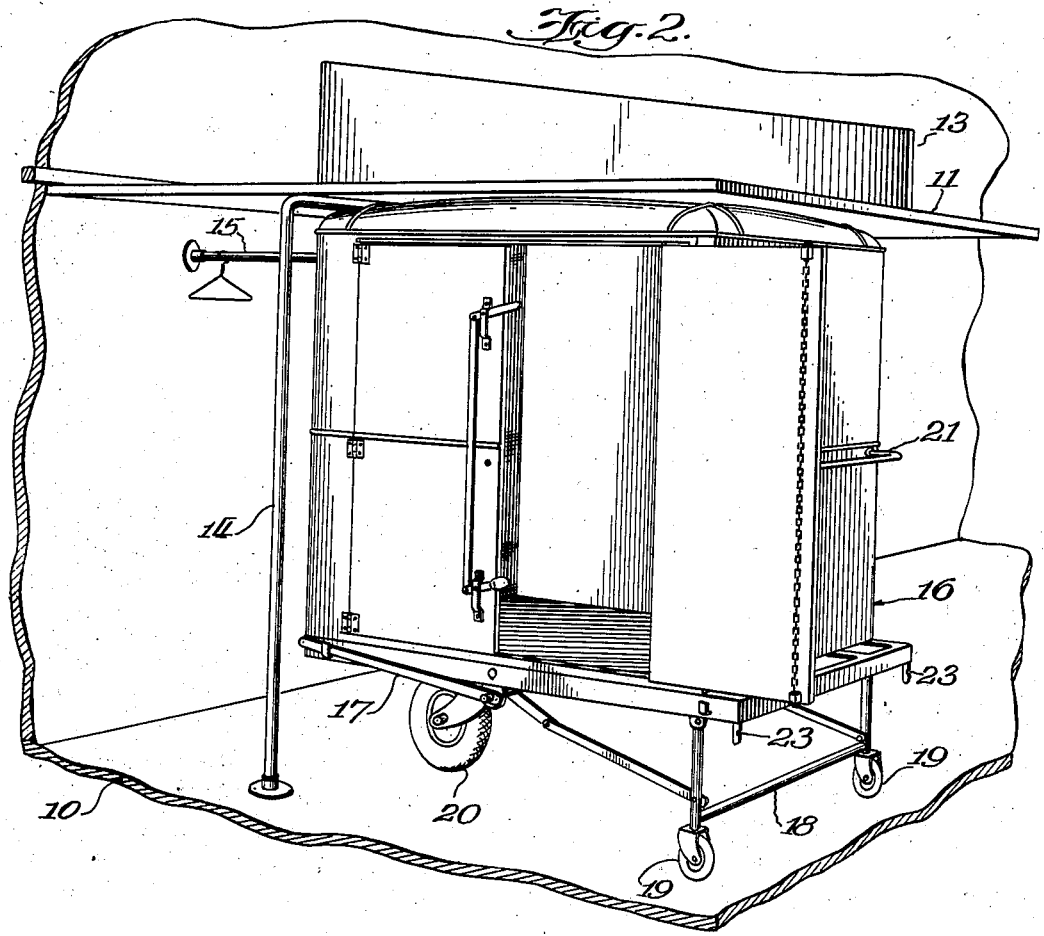
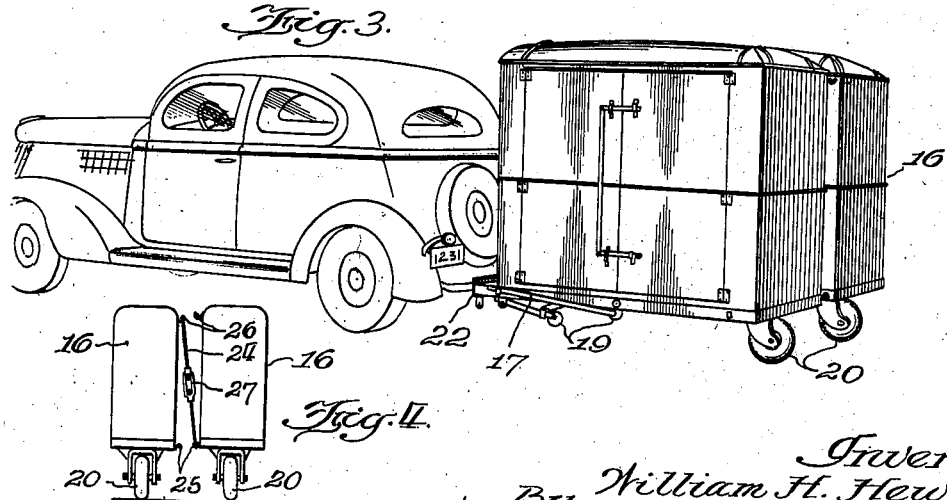
Inventor:
William H. Hewitt
By Williams, Bradbury, McCaleb & Hinkle
Attys.

Patented Mar. 5, 1940

2,192,575

UNITED STATES PATENT OFFICE 2,192,575

MATERIAL DISTRIBUTION SYSTEM

William H. Hewitt, Chicago, Ill., assignor to The Hewitt Delivery Systems, Inc., Boston, Mass., a corporation of Delaware Application December 16, 1936, Serial No. 116,136

8 Claims. (Cl. 214—152)

The invention relates to a system of transporting materials from a shipping room to points where the materials are to be delivered. The transportation is carried out in a novel type of trailer, which is particularly adapted for attachment to the rear of a passenger vehicle.

From the use of a passenger vehicle to transport the trailers important advantages accrue. The passenger vehicle may be used for pleasure while the trailer is detached therefrom, so that a saving is effected that is substantially equal to the difference between the cost of a fleet of trucks and the cost of a fleet of trailers. Further important savings can be obtained if the drivers who operate the passenger vehicles with trailers attached during working hours are permitted to use the vehicles for their personal benefit outside of working hours.

The employer can easily obtain drivers who are willing to provide garages for passenger vehicles that they are permitted to use outside of working hours. The drivers can also be required to furnish all the gasoline and oil that the vehicles consume, including possibly the fuel and oil that is consumed while the vehicles are in the service of the employer.

The principal object of the invention is to provide a convenient and economical system for distribution of materials.

More specific objects and advantages are apparent from the description, in which reference is had to the accompanying drawings illustrating preferred devices for carrying out the invention.

Fig. 1 of the drawings is a diagrammatic plan view of a building in which a number of trailers are arranged in proper position, together with two passenger automobiles and a pair of trailers for connection to each automobile;

Fig. 2 is a perspective view of one of the trailers in position in the building;

Fig. 3 is a perspective view of a passenger automobile with two trailers attached; and Fig. 4 is a rear elevation of two trailers secured to an automobile, showing an arrangement for supporting the rear of one trailer from the other.

Figure 1:
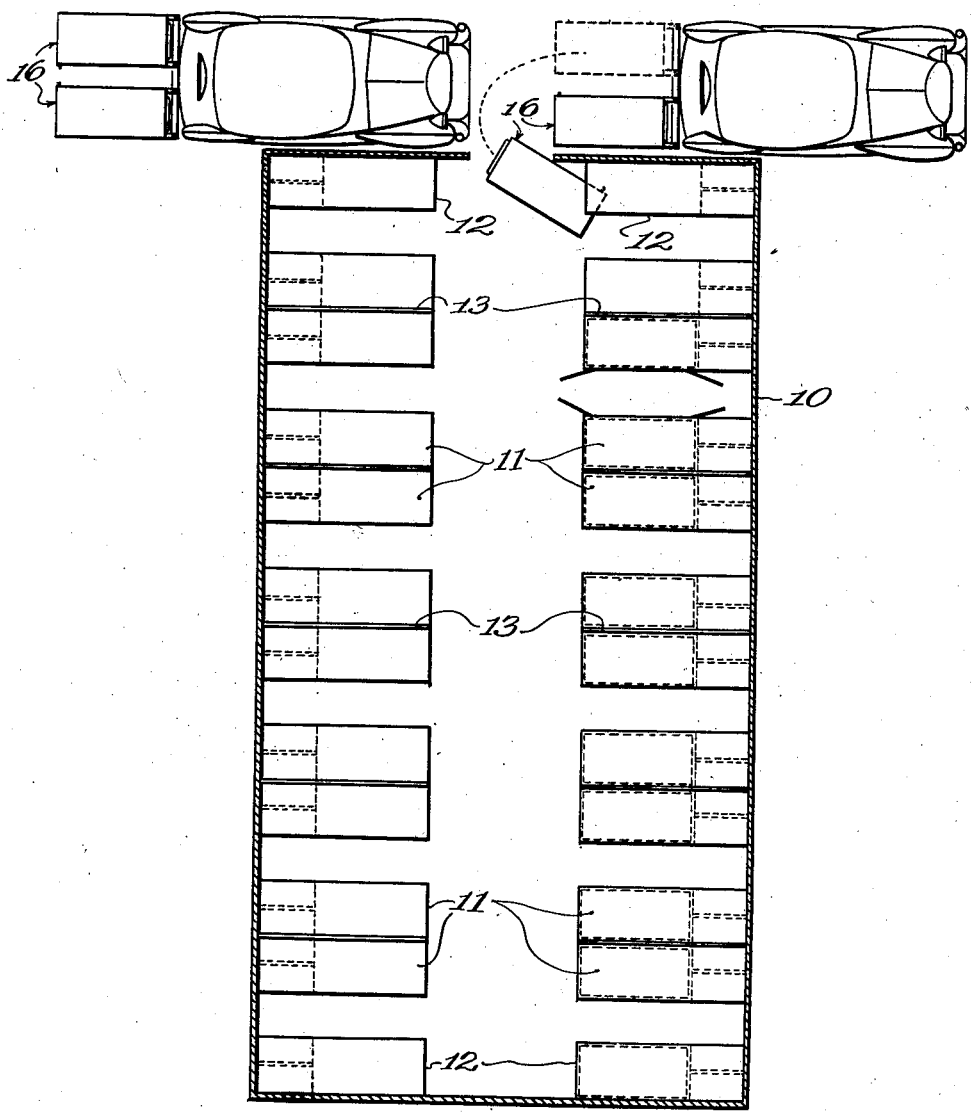

These specific drawings and the specific description that follows merely disclose and illustrate the invention, and are not to impose limitations upon the claims.

In accordance with the preferred method of distributing materials, each trailer is stored inside the building, where it is used as a bin. When the trailer is so used, it is packed with the materials that are to be distributed, and after the packing of the trailer has been completed it is moved from the building and connected behind a suitable vehicle. After the trailer has been transported by means of the vehicle to points where deliveries are to be made, it is disconnected therefrom and again placed inside of the building.

The packing of the trailer is preferably carried out at night so that the following day can be used for delivery of the materials. If a passenger automobile is used for transporting the trailer, it can be used as a pleasure car while the trailer is being packed inside the building. The trailers are preferably constructed so that they can be moved about by hand, and two of the trailers may be connected side by side behind each vehicle.

Each trailer is preferably provided with doors to permit insertion and removal of the materials, which are located on the side of the trailer that faces outward when the trailer is connected beside its mate at the rear of the vehicle. Then, when the two trailers are moved into position for loading, they may be so arranged that their open sides face a common loading area, after which the two trailers may conveniently be loaded simultaneously.

Each of the trailers is preferably hinged to the rear of the vehicle in such manner that the trailer pivots about a transverse horizontal axis at the hinge. However, any arrangement may be employed that provides for pivoting of the trailers in a vertical plane while keeping the trailers parallel to one another. If the trailers swivel in a horizontal plane with respect to the vehicle to which they are secured, they should swivel together so that they remain parallel. When each of the trailers is less than half as wide as the vehicle, and when they are hinged to pivot about a transverse horizontal axis, but are not permitted to swivel with respect to the vehicle, the trailers may be spaced apart to a sufficient extent so that the driver of the vehicle can use a rear vision mirror to see through the rear window of the vehicle and between the trailers.

The most suitable device for supporting a trailer that is hinged to a vehicle in such manner that it can pivot in a vertical plane, but cannot swivel in a horizontal plane, is a single swiveled wheel, which is preferably located near the rear end of the trailer.

The use of a pair of trailers arranged side by side is especially advantageous when the vehicle and trailers are parked next to a high curb. The trailer nearest the curb is not tilted toward the curb nearly as much as a single wider trailer would be. Difficulty in opening the doors of the trailer as it stands next to the curb is thus obviated, and the semi-trailer can be built close to the ground level.

In the preferred arrangement illustrated generally in Fig. 1, a building 10 is provided with a series of double shelves 11 in the form of cantilevers, extending inward toward the center aisle of the building. At each end of the building are two single shelves 12 on opposite sides of the aisle, each of which corresponds to one-half of one of the double shelves 11. Each of the shelves 11 is divided into two parts by means of a partition 13 (see Fig. 2). A suitable frame 14 supports the central portion of each shelf, and a rod 15 may extend outward from each frame to the wall of the building, to provide a place for the hanging of garments supported upon ordinary hangers.

When a pair of the trailers 16 is to be packed with materials to be distributed, the trailers are placed opposite one another, with their open sides adjacent, beneath two adjacent shelves. Each of the double shelves 11 accommodates two trailers placed back to back.

The advantages of the arrangement that has been described is that the open sides of a pair of trailers that are to be hauled by one automobile face a common loading area so that the two trailers that are to travel together can be loaded together.

The trailers may also be lined up end-to-end along a wall, with their closed sides against the wall. Each pair of trailers should then be placed front to front or rear to rear, so that the trailers actually have the appearance of being arranged in pairs, and so that each mated pair of trailers can easily be distinguished in the row of trailers.

Fig. 1 is intended to represent the shipping department of a laundry or dry cleaning establishment in which the shelves are stacked with bundles during the day, while the trailers are being transported to points where the bundles loaded on the previous night are to be delivered. At the end of the day, when the shelves have been stacked with bundles, the trailers are placed in their proper positions beneath the shelves, and the following night is used for the loading of the trailers. The trailers are taken out on the succeeding day, and the bundles are delivered.

The trailers 16 are adapted to be secured in pairs to the rear end of an automobile, as shown in Fig. 3. Each of the trailers of the preferred type illustrated in the drawings is less than half as wide as the automobile so that it can easily pass through a doorway of ordinary size.

Fig. 2 shows a lever 17 which actuates suitable mechanism by means of which a frame 18, bearing a pair of casters 19, can be lowered to the ground when the trailer is to be detached from an automobile.

Fig. 3 shows the frame and casters in raised position.

When the trailer is to be moved about by hand, the single swiveled wheel 20 that supports the trailer when it is being pulled by an automobile is preferably secured against swiveling so that the trailer cannot be upset.

A rail 21 is provided by means of which the trailer is pushed about by hand. The bumper of each automobile that is to haul a pair of trailers is removed and replaced by a channel 22. The horizontal flange of the channel is provided with slots, into which suitable tongues 23 on the chassis of the trailer may drop.

The trailers are thus hinged to pivot about a transverse axis at the channel. Each trailer is merely brought up to the rear of the automobile, with the tongues 23 just over the slots in the horizontal flange of the angle 22, and when the frame 18, with its casters 19, is drawn up beneath the trailer, the tongues 23 drop into the slots. After all deliveries have been made, the tongues 23 are lifted out of the slots by the lowering of the frame and casters, and the trailer is thereby detached from the angle 22.

By my invention I divide the trailed lot of goods into two parts, one of which is loaded in one of the twin trailers and another part of which is loaded in the other trailer. This has many operating advantages as compared with carrying the entire lot in a single trailer of similar type. One advantage is that in rounding curves at high speed, the rocking tendency of the load does not tend to rock the automobile as much as in the case of a single trailer carrying an equivalent total load. That is because a large portion of the rocking forces of the twin trailers balance each other and are absorbed by the channel bar 22 as a bending strain thereon. Another advantage is that the jolts imparted to the automobile are of much less magnitude. That is because when the road wheel of one trailer suffers a jar from road bumps, only half the total load is given a resulting erratic momentum to be imparted to the automobile as a lunge, pull, side jerk, or the like. It is only rarely that the road wheels of both trailers would encounter some similar bumps simultaneously. For the most part, therefore, their jolts are imparted severally to the automobile and in much less magnitude than would be the case if the entire load were carried in a single trailer. Thus dividing the lot of goods between the twin trailers instead of carrying it all in one trailer, results in greater riding stability for the automobile and less severe strains thereon.

Fig. 4 illustrates an arrangement for temporarily taking the weight off the road wheel of one trailer when the tire on that wheel has gone flat. This advantageous arrangement is made possible by the employment of two trailers hinged to the rear of an automotive vehicle in accordance with the invention. After the loops at the ends of the cable 24 have been slipped over a hook 25 at the bottom of the trailer to be supported and a hook 26 at the top of the other trailer, the intermediate turnbuckle 27 is screwed up until the weight has been taken off the flat tire.

The trailer which I prefer to use in carrying out my system is disclosed and claimed in my co-pending application Serial No. 116,137, filed December 16, 1936, since issued as Patent No. 2,113,448 of April 5, 1938, and reference is made thereto for more detailed description of the trailer unit.

The system that has been described may be modified and various other systems embodying the substance of the invention may be devised to meet various requirements.

I claim:

1. A method of distributing materials that comprises storing a narrow trailer inside a building at night and using them as bins by packing them with materials to be distributed, removing them from the building on the following day and, without the building, connecting them side-by-side behind a passenger automobile, trailing them by the automobile to points where deliveries are to be made, unloading them at delivery points, trailing them back to the building, disconnecting them from the automobile, moving them about by hand as bins within the building on the succeeding night, leaving the automobile available for use as a pleasure car without a trailer while the trailers are disconnected therefrom, some of the movements of the trailer while separated from the automobile being through passageways too narrow for feasible passage of the automobile.

2. A method of distributing materials that comprises arranging two manually movable trailers, which open at one side, inside a building with their open sides facing a common loading area, using the trailers as bins by packing them with materials to be distributed, removing them from the building when they have been packed, and connecting them side by side in the opposite manner, with their closed sides adjacent, behind a vehicle for transporting them to points where deliveries are to be made.

3. A method of distributing materials that comprises arranging two trailers that open at one side with the open sides of the trailers facing a common loading area, removing the trailers from their positions and arranging them side by side in the opposite manner, with their closed sides adjacent, and connecting the trailers so arranged behind a vehicle for transporting the trailers to points where deliveries are to be made therefrom.

4. The method of distributing goods to delivery points from a region within a building and served only by one or more passageways not adapted for feasibly driving a standard automobile therethrough, which comprises wheeling by hand through one of said passageways and upon its own wheels a road trailer which is considerably smaller and narrower than a standard automobile, packing the trailer as a bin within said region, wheeling the trailer by hand out through one of said passageways to a region readily accessible by an automobile, there connecting the trailer as a semi-trailer to a standard passenger automobile, drawing the trailer by the automobile to delivery points, unpacking the trailer at the delivery points, drawing the trailer behind the automobile back to the building, there disconnecting it from the automobile, leaving the automobile free for use as a pleasure car without a trailer, and again wheeling the trailer by hand as a bin through one of said passageways to said region within the building and there again packing the trailer as a bin.

5. The method of distributing goods to delivery points from a region within a building and served by one or more passageways not adapted for feasibly driving a standard automobile therethrough, which comprises wheeling through one of those passageways and upon their own wheels road trailers considerably smaller and narrower than the standard automobile, loading the trailers as bins within said region, wheeling each of the trailers out through one of said passageways to a region readily accessible by an automobile, there connecting the trailers side-by-side as semi-trailers to a standard passenger automobile, drawing the trailers thereby to delivery points, unloading the trailers at the delivery points, drawing the trailers behind the automobile back to the building, there disconnecting them from the automobile, and again wheeling each of the trailers as bins through one of said passageways to said region within the building and there again packing the trailers as bins.

6. The method of distributing goods to a delivery point from regions within a building which comprises wheeling by hand, upon its own self-supporting wheels, a bin-like vehicle, considerably narrower than a standard automobile, loading the trailer as a bin within said building, wheeling the vehicle to a region readily accessible by an automobile, there connecting the vehicle as a semi-trailer, side-by-side with another such vehicle, to a standard passenger automobile, simultaneously trailing the two vehicles as semi-trailers by the automobile to delivery points, unloading the vehicles at the delivery points, drawing the vehicles as semi-trailers by the automobile back to the building, there disconnecting them from the automobile, leaving the automobile free for use as a pleasure car without a trailer and again wheeling the vehicles by hand as bins in the building.

7. The method of transporting an automobile-trailable lot of goods from within a building along highways to delivery points, which consists in loading the lot some in one and some in the other of a pair of wheeled factory bins within the building, wheeling the loaded bins about by hand on their own wheels within and out from the building, positioning the pair of bins side-by-side behind an automobile and more or less within the rearward projection thereof, trailing the bins in that position to delivery points over highways as semi-trailers behind an automobile, while forwardly supporting the bins on the rear of the automobile and rearwardly supporting the bins on their own road wheels and while permitting the bins to swing up and down independently of each other as their rearward wheels pass over road bumps whereby the jolts imparted to the automobile by the momentums of the goods in the respective bins set in motion by road jars suffered by the bin road wheels are imparted to the automobile severally and in less magnitude than if the entire lot of goods were carried by a single similar semi-trailer, and unloading the goods from the bins at the delivery points.

8. The method of transporting an automobile-trailable lot of goods from within a building along highways to delivery points, which consists in loading the lot some in one and some in the other of a pair of wheeled factory bins within the building, wheeling the loaded bins about by hand on their own wheels within and out from the building, positioning the pair of bins side-by-side behind an automobile and more or less within the rearward projection thereof, trailing the bins in that position to delivery points over highways as semi-trailers behind an automobile, while forwardly supporting the bins on the rear of the automobile and rearwardly supporting the bins on their own road wheels, while permitting the bins to swing up and down independently of each other as their rearward wheels pass over road bumps whereby the jolts imparted to the automobile by the momentums of the goods in the respective bins set in motion by road jars suffered by the bin road wheels are imparted to the automobile severally and in less magnitude than if the entire lot of goods were carried by a single similar semi-trailer, and while maintaining the bins spaced apart to leave a rear vision space for the driver therebetween, and unloading the goods from the bins at the delivery points.

WILLIAM H. HEWITT.